US010899246B1

(12) United States Patent
Babu et al.

(10) Patent No.: US 10,899,246 B1
(45) Date of Patent: Jan. 26, 2021

(54) METHOD AND APPARATUS FOR LOCALIZATION OF VEHICLE SIDE ELECTRICAL CHARGER UNITS

(71) Applicant: ABB Schweiz AG, Baden (CH)

(72) Inventors: Sree Shankar Satheesh Babu, Bloomfield, CT (US); William J. Eakins, Coventry, CT (US); Gregory A. Cole, West Hartford, CT (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/695,076

(22) Filed: Nov. 25, 2019

(51) Int. Cl.
| | |
|---|---|
| *B60L 53/37* | (2019.01) |
| *B60L 53/16* | (2019.01) |
| *G02B 27/00* | (2006.01) |
| *H04N 5/225* | (2006.01) |
| *G06T 7/73* | (2017.01) |

(52) U.S. Cl.
CPC ............ *B60L 53/37* (2019.02); *B60L 53/16* (2019.02); *G02B 27/0006* (2013.01); *G06T 7/74* (2017.01); *H04N 5/2252* (2013.01); *H04N 5/2254* (2013.01); *G06T 2207/30252* (2013.01)

(58) Field of Classification Search
CPC . B60L 53/37; B60L 53/16; G06T 7/74; G06T 2207/30252; G02B 27/0006; H04N 5/2252; H04N 5/2524
See application file for complete search history.

(56) References Cited

U.S. PATENT DOCUMENTS

| | | | |
|---|---|---|---|
| 8,627,534 B2* | 1/2014 | Van Dyke | B08B 3/02 15/21.1 |
| 2014/0300320 A1* | 10/2014 | Nakajima | H01R 13/6275 320/109 |
| 2017/0106763 A1* | 4/2017 | Dow | B60L 53/305 |

* cited by examiner

*Primary Examiner* — Michael E Teitelbaum
(74) *Attorney, Agent, or Firm* — Taft Stettinius & Hollister LLP; J. Bruce Schelkopf

(57) ABSTRACT

A method and apparatus for determining a location and/or orientation of at least a portion of an electric vehicle relative to at least a portion of a charging station. A camera system can include a camera housing having outer, intermediate, and inner layers that are concentric to each other. The outer, protective layer and the intermediate layer can each have wiper assemblies that wipe debris from a surface of the intermediate layer or inner layer, respectively, as the associated outer or intermediate layer is rotated. The intermediate layer also include one or more lenses that are selectively to capture an image(s) of the vehicle by a camera. The camera housing can be lifted from a recessed position in an assembly housing while the outer layer is simultaneously rotatably retracted so that the camera can capture an image through the inner layer and a selected lens of the intermediate layer.

15 Claims, 9 Drawing Sheets

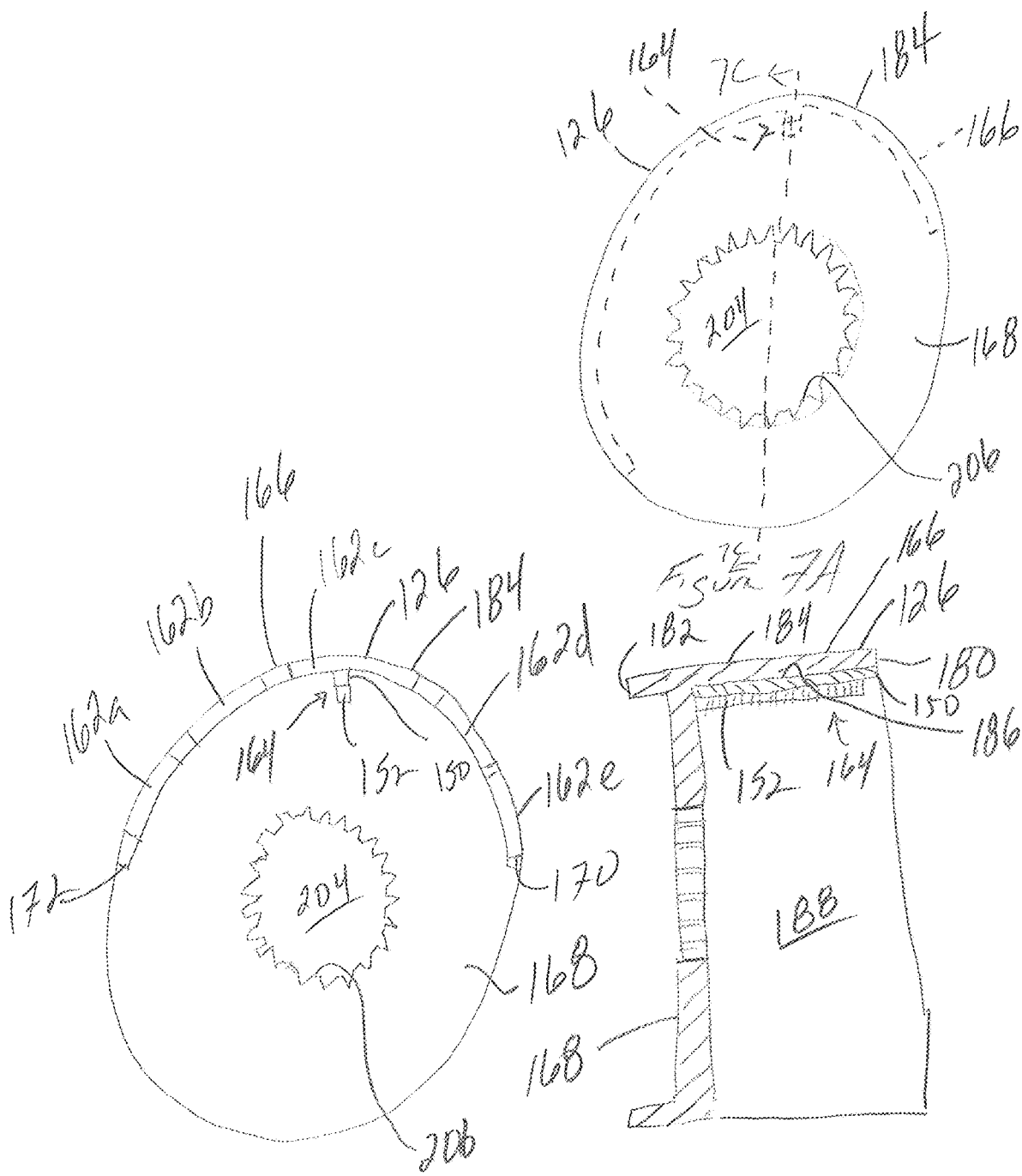

METHOD AND APPARATUS FOR LOCALIZATION OF VEHICLE SIDE ELECTRICAL CHARGER UNITS

BACKGROUND

Embodiments of the present disclosure generally relate to automatic electric vehicle charging systems. More particularly, but not exclusively, embodiments of the present disclosure relate to localization of electrical charger units on vehicles relative to charging stations of automatic electric vehicle charging systems.

At least certain types of charging systems for electric vehicles involve an operator manually connecting an electrical connector of a charging station to a vehicle. Yet, such manual operation can require physical capabilities that not all drivers or operators of electric vehicles possess, as well as be time consuming. Further, given the degree of electrical power that can be transmitted in connection with charging at least certain types of electrical vehicles, such manual involvement with charging operations can present at least certain safety concerns.

Conversely, automated charging operations for electric vehicles can sometimes require infrastructure, including available space and economic capacity that may prohibit such use of such automatic charging systems in at least certain environments or settings. For example, manners in which at least some types of vehicles are automatically charged may not necessarily be suitable for other types of vehicles and vehicle settings, including, but not limited to, passenger vehicles and associated residential environments or settings. Additionally, automatic charging systems may have to deal with certain environmental factors, including, for example, dirt, dust, water, and other forms of debris and contaminants that can adversely affect the operation of at least certain aspects of the automatic charging system. For example, such debris can enhance the difficulty and/or time associated with automatically locating a charging unit on the vehicle, as well as aligning components of a charging station that are to be electrical coupled to vehicle-side charging unit in association with charging of an energy storage device of, or for, the vehicle.

Accordingly, there remains a need for further contributions in this area of technology.

BRIEF SUMMARY

An aspect of the present disclosure is an apparatus for housing a camera that can include an outer layer having an inner surface and an outer surface, the inner surface being coupled to an outer wiper assembly. The apparatus can also include an intermediate layer having an outer surface, an inner surface, and one or more lenses. The outer surface of the intermediate layer can be positioned for engagement with the outer wiper assembly, and the inner surface of the intermediate layer can be coupled to an inner wiper assembly. The apparatus can also include an inner layer having an outer surface and an inner surface, the outer surface of the inner layer being positioned for engagement by the inner wiper assembly, and the inner surface of the inner layer defining an interior area that is sized to receive placement of the camera. Additionally, the outer layer can be concentric with the intermediate layer and the inner layer. Further, the outer layer can be rotatably displaceable relative to at least the intermediate layer such that, during rotation of the outer layer, the outer wiper assembly wipes the outer surface of the intermediate layer. The intermediate layer can be rotatably displaceable relative to at least the inner layer such that, during rotation of the intermediate layer, the inner wiper assembly can wipe the outer surface of the inner layer.

Another aspect of the present disclosure is an apparatus that can include a camera housing having an outer layer, an intermediate layer, and an inner layer that can be concentric to each other. The outer layer can have an outer wiper assembly that can be positioned and sized to wipe a surface of the intermediate layer as the outer layer is rotatably displaced about the intermediate layer. The intermediate layer can have an inner wiper assembly that can be positioned and sized to wipe a surface of the inner layer as the intermediate layer is rotatably displaced about the inner layer. Additionally, the intermediate layer can have one or more lenses. The apparatus can also include a first driver that can be coupled to a first pinion and connected to the camera housing. The first pinion can be operably engaged with a first gear of the outer layer so that operation of the first driver can be translated into rotational displacement of the outer layer about the intermediate layer. The apparatus can also include a second driver that can be coupled to a second pinion, the second pinion being operably engaged with a second gear of the intermediate layer so that operation of the second driver is translated into rotational displacement of the intermediate layer about the inner layer. Further, the apparatus can include an assembly housing having a rack that operably engages the first pinion while the first pinion is operably engaged with the first gear such that operation of the first driver can be translated into linear displacement of the camera housing while the outer layer is simultaneously being rotatably displaced.

Additionally, an aspect of the present disclosure is a method that can include lifting, in response to detection of a vehicle, a camera housing of a camera system from an assembly housing, and rotating, as the camera housing is being lifted, an outer layer of the camera housing about an intermediate layer of the camera housing. Additionally, a surface of the intermediate layer can be wiped by an outer wiper assembly of the outer layer via rotation of the outer layer. The intermediate layer can be rotated to displace a first lens of the intermediate layer to a position at which one or more images of the vehicle can be captured by a camera located in the camera housing and through at least the first lens. Further, a surface of an inner layer of the camera housing that is positioned between the intermediate layer and the camera can be wiped by an inner wiper assembly of the intermediate layer via rotation of the intermediate layer. The method can further include capturing, via operation of the camera, one or more images, and processing the captured one or more images to determine a relative position and/or orientation of at least a portion of the vehicle.

BRIEF DESCRIPTION OF THE DRAWINGS

The description herein makes reference to the accompanying figures wherein like reference numerals refer to like parts throughout the several views.

FIGS. 7A and 7B illustrate front and rear side views, respectively, of an exemplary intermediate section of a camera housing for a camera system according to an illustrated embodiment of the subject application.

FIG. 7C illustrates a cross sectional view of an exemplary intermediate section of a camera housing taken along line 7A-7A in FIG. 7A.

Figure 1:
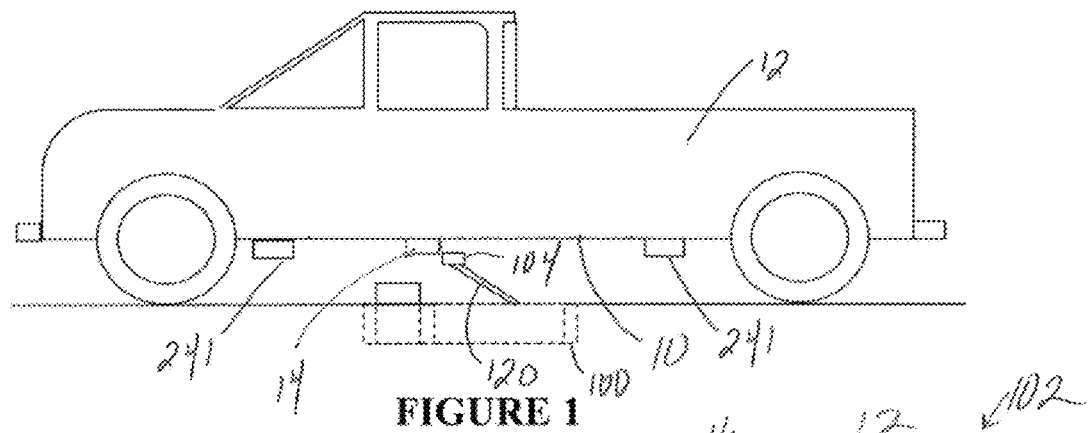
FIG. 1 illustrates an undercarriage of an exemplary vehicle positioned over a charging station of an automatic electric vehicle charging system.

The foregoing summary, as well as the following detailed description of certain embodiments of the present disclosure, will be better understood when read in conjunction with the appended drawings. For the purpose of illustrating the disclosure, there is shown in the drawings, certain embodiments. It should be understood, however, that the present disclosure is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1 illustrates an undercarriage 10 of an exemplary vehicle 12 positioned over a charging station 100 of an automatic electric vehicle charging system 102. The vehicle 12 can take a variety of different forms. For example, exemplary vehicles can include, and are not limited to, passenger vehicles, trucks, buses, commercial vehicles, industrial vehicles, on-road vehicles, and/or off-road vehicles, as well as a combination thereof, among other vehicles. Additionally, the vehicles used with the automatic electric vehicle charging system 102 can include a variety of different types of at least partially electrically rechargeable vehicles, including, for example, electrical vehicles that are commonly referred to as "EV", as well has hybrid electrical vehicles that can include both at least some form electric propulsion and another powertrain, such as, for example, a fossil fuel-powered powertrain.

As shown in FIG. 1, the vehicle 12 can include, or be attached to, a vehicle-side electrical charge unit (VSU) 14. The VSU 14 can be configured for selective electrical coupling to a plug head 104 of an electrical charger unit 106 of the charging station 100. The electrical charger unit 106 can be electrically coupled to a power source, such as, for example, a power grid or other power utility source, among other power sources. Moreover, the electrical charger unit 106 can be into position relative to the to the VSU 14 of the vehicle 12 such that and electrical connection can be established to facilitate the delivery of electrical power from the electrical charger unit 106 and to, or through, the VSU 14 of the vehicle 12 such that the electrical power can be delivered to one or more batteries 16 of, or for use with, the electrical propulsion of the vehicle 12. According to at least certain systems, such electrical connections can include, but are not limited to, a plug head 104 of the electrical charger unit 106 being displaced to a position at which the plug head 104 is electrically coupled to the VSU 14 of the vehicle 12.

Figure 2:
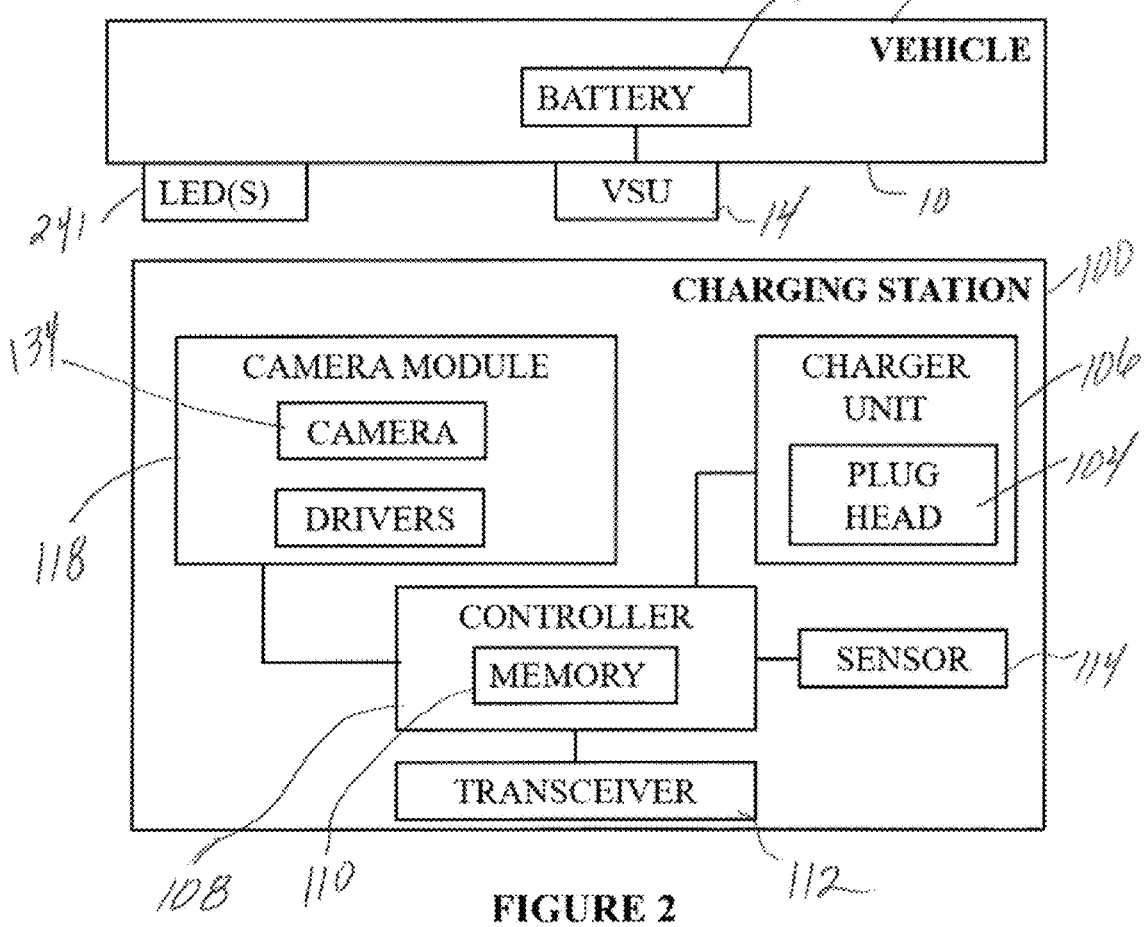
FIG. 2 illustrates a schematic representation of a portion of an exemplary automatic electric vehicle charging system having a charging station that includes a camera system according to an illustrated embodiment of the subject application.

As shown in FIG. 2, the charging station 100 can include a controller 108 that is in communication with at least the electrical charger unit 106, among other components of the charging station 100. The controller 108 can, for example, be dedicated to performing particular tasks associated with the operation of at least the charging station 100, or can be used for a variety of other tasks related to the operation of the automatic electric vehicle charging system 102. The controller 108, which can be local or remote with respect to the location of the charging station 100, can include a processing device, such as, for example, a programmable, dedicated, and/or hardwired state machine, or any combination thereof. The processing device of the controller 108 can also include one or more processors such as, for example, Arithmetic-Logic Units (ALUs), Central Processing Units (CPUs), Digital Signal Processors (DSPs), or the like. Processing devices with multiple processing units can also utilize distributed, pipelined, and/or parallel processing. The processing device of the controller 108 can also be dedicated to performance of just the operations described herein, or can be utilized in one or more additional applications. In the depicted form, the processing device of the controller 108 is of a programmable variety that executes algorithms and processes data in accordance with operating logic as defined by programming instructions (such as software or firmware) stored in a memory 110 of the controller 108. Alternatively or additionally, the operating logic can be at least partially defined by hardwired logic or other hardware. The processing device of the controller 108 can include one or more components of any type suitable to process the signals received from at least the electrical charger unit 106, and to provide desired output signals. Such components can include digital circuitry, analog circuitry, or a combination of both.

The memory 110 can be included with the, and/or coupled to, the controller 108. Further, the memory 110 can be of one or more types, such as a solid-state variety, electromagnetic variety, optical variety, or a combination thereof. Additionally, the memory 110 can be volatile, nonvolatile, or a combination thereof, and some or all of the memory 110 can be of a portable variety, such as a disk, tape, memory stick, cartridge, or the like. In addition, according to certain embodiments, the memory 110 can store data that is manipulated by the operating logic of the processing device of the controller 108, such as data representative of signals received by a transceiver 112 of the charging station 100 that can be communicatively coupled to the vehicle 12 or other components of the automatic electric vehicle charging system 102, in addition to, or in lieu of, storing programming instructions defining the operating logic.

The controller 108 can be communicatively coupled to one or more sensors 114 of the charging station 100 and/or of the automatic electric vehicle charging system 102. The sensors 114 may take a variety of different forms, including, but not limited to, proximity sensors, motion sensors, visual sensors, and video devices, among other types of sensors and devices. For example, according to certain embodiments, the sensors 114 can comprise one or more proximity sensors that can detect a position of the vehicle 12 relative to the charging station 100, including, for example, when the undercarriage 10 of the vehicle 12 is positioned over at least a portion of the charging station 100. Thus, according to certain embodiments, the charger unit 106 can be positioned around, if not at least partially below, a ground surface such that an undercarriage 10 of the vehicle 12 is positioned above the charging station 100.

As seen in FIG. 2, according to certain embodiments, the controller 108 can be communicatively coupled to a camera module or system 118 of the charging station 100. According to the illustrated embodiment, the controller 108 can be configured to control operation of the camera system 118, including, for example, commencing and ceasing operation of the camera system 118 and/or controlling movements of the camera system 118, including movements related to operation of one or more drivers of the camera system 118. The controller 108 can also control the selection of lenses, and the associated optics, used by the camera system 118 in capturing images and/or data, among other actions and operations of the camera system 118. Additionally, the controller 108 can also receive information from the camera system 118, including images or other captured data, that can be processed and used by the controller 108 to determine the location and/or orientation of the vehicle 12 and/or VSU 14 relative to at least the location of the charger unit 106, plug head 104, and/or charging station 100. The controller 108 can also utilize images and/or information provided by the camera system 118 to determine the type of vehicle 12 positioned above, or otherwise adjacent to, at least a portion of the charger unit 106, and based at least in part on such information, determine the relative location of the VSU 14 of the vehicle 12.

The camera system 118 can be located at a variety of locations about the charging station 100. For example, according to certain embodiments, the camera system 118 can be mounted, or otherwise coupled, to a moveable arm 120 that is connected to the plug head 104. Movement of the arm 120, can occur in a variety of manners, including, for example, via operation of one or more servomotors, among other drivers. Further, such operation of the servomotors or other drivers may be controlled via the controller 108. Thus, the controller 108 can control, at least in part, the position and/or movement of the camera system 118 and the plug head 104 relative to other portions of the charging station 100 and/or the vehicle 12.

Figure 3:
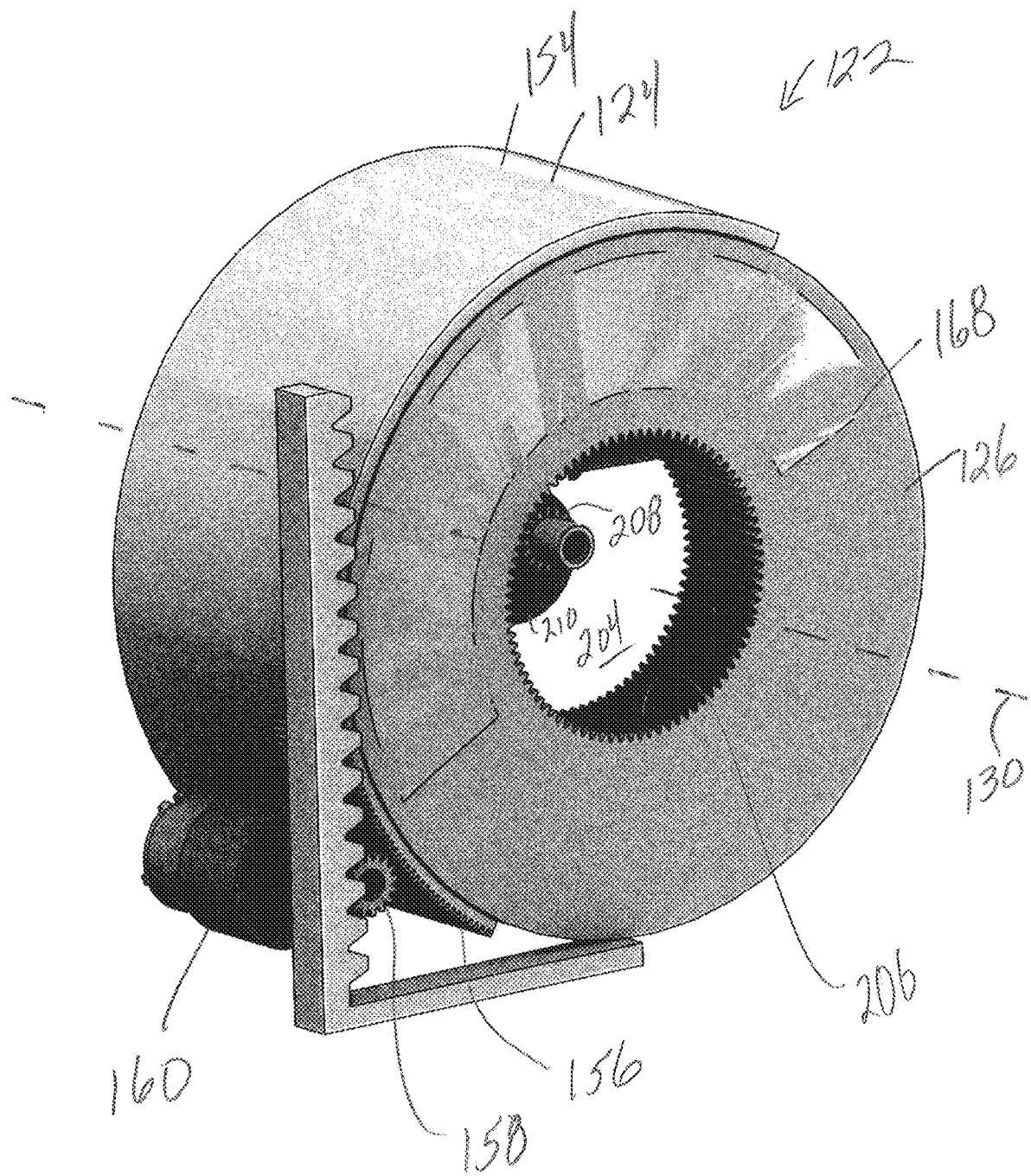
FIGS. 3-5 illustrate side perspective views of a portion of an exemplary camera system according to an illustrated embodiment of the subject application.
Figure 4:
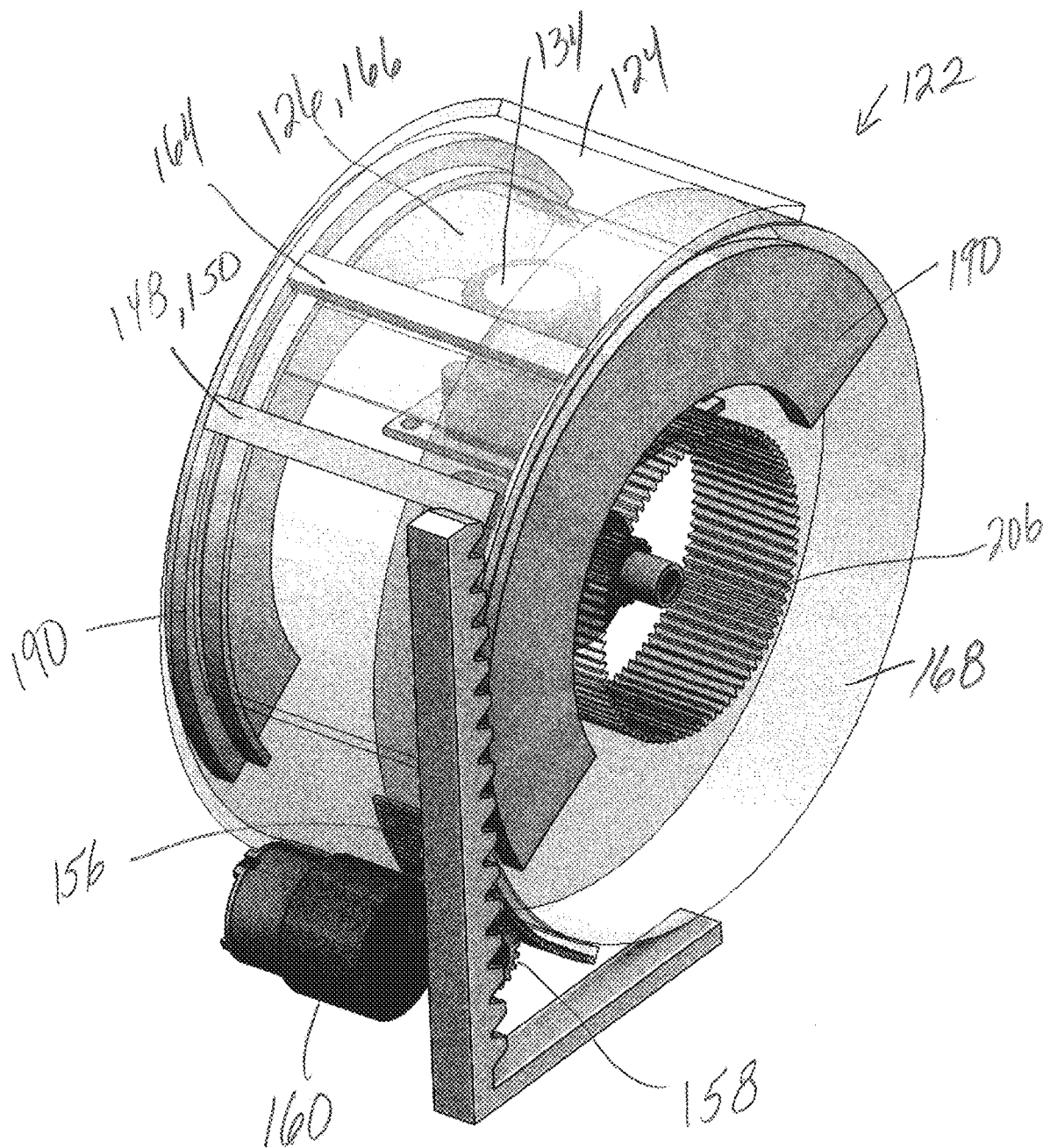
Figure 5:
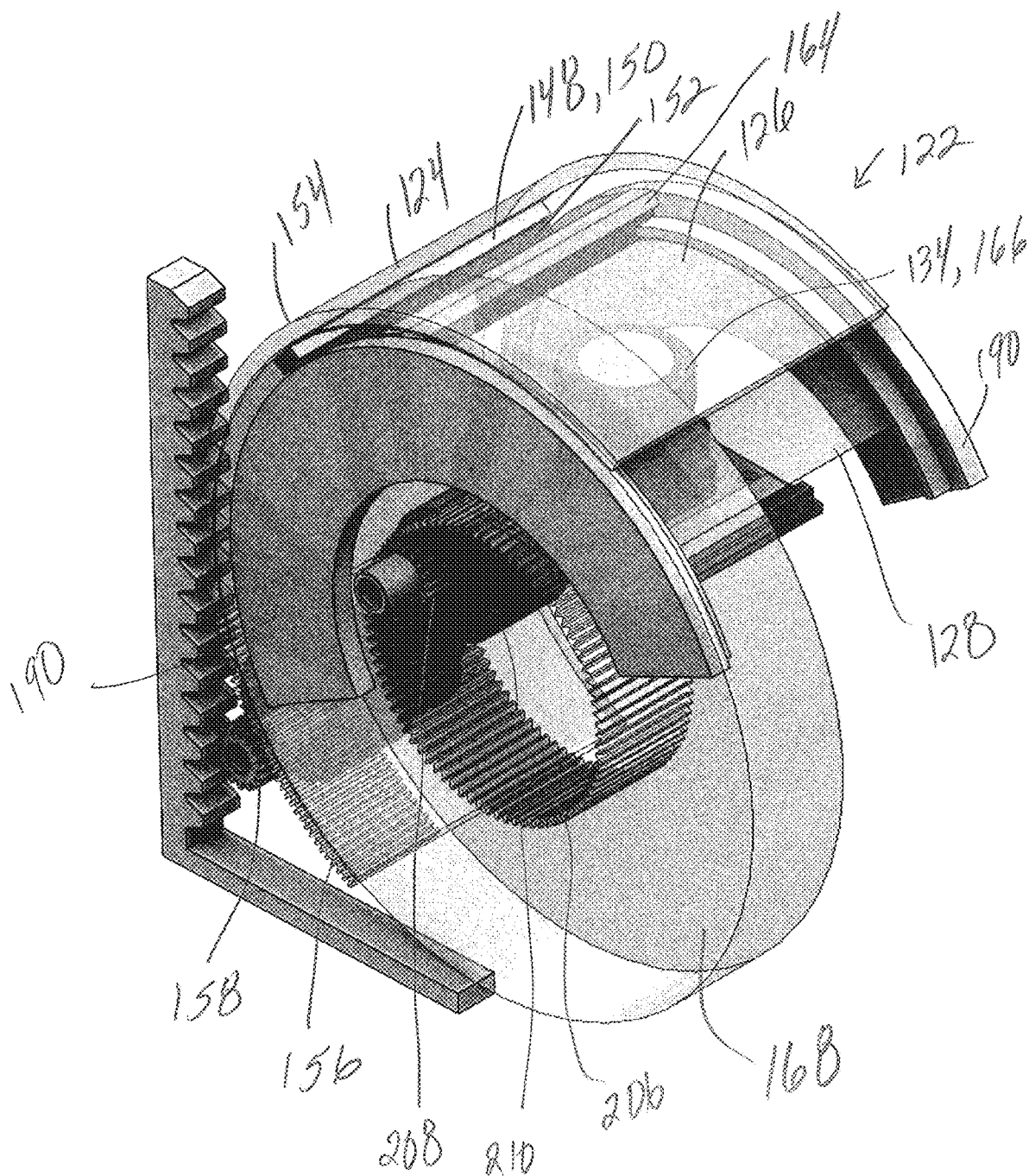

Referencing FIGS. 3-5, according to certain embodiments, the camera system 118 includes a camera housing 122 having a plurality of concentrically arranged sections or layers. According to the illustrated embodiment, the plurality of sections include an outer section 124, an intermediate section 126, and an inner section 128. The outer, intermediate, and inner sections 124, 126, 128 can have a variety of shapes and configurations. Further, one or more of the outer, intermediate, and inner sections 124, 126, 128 can have a shape that may, or may not, be similar to the shape of another one of the outer, intermediate, and inner sections 124, 126, 128. Further, according to certain embodiments, the outer section 124 can be configured to rotate about at least a portion of the intermediate section 126, and the intermediate section 126 can be configured to rotate about at least a portion of the inner section 128. Thus, the concentric outer and intermediate sections 124, 126 can share an axis of rotation 130 (FIG. 3), which may also be a central longitudinal axis of the inner section 128.

Referencing FIGS. 6A-6D, according to the illustrated embodiment, the outer section 124 can be the outermost layer of the camera housing 122. As discussed below, the outer section 124 can be constructed to both provide a degree of protection to the camera housing 122, as well as to remove at least some debris and contaminants from an outer surface 184 (FIG. 7A) of the intermediate section 126. The outer section 124 can be constructed from a material having a rigidity and/or stiffness that can protect at least the other sections 126, 128 of the camera housing 122 and/or a camera 134 (FIGS. 2 and 4) contained therein. Moreover, the outer section 124 can be configured to accommodate a wheel(s) of the vehicle 12 being driven over, and/or onto, the outer section 124, and thus the camera housing 122. Accordingly, the outer section 124 can be constructed from a variety of materials, including, but not limited to, stainless steel, among other materials.

The outer section 124 can have a variety of different shapes, including, but not limited to, circular and non-circular shapes, as well as combinations thereof, among other shapes. For example, according to certain embodiments, the outer section 124 can have a cylindrical cross sectional shape, or, alternatively, have an arc shape, as shown, for example, in at least FIG. 6B. Thus, according to certain embodiments in which the outer section 124 has an at least partial, but not enclosed, circular cross sectional shape, the outer section 124 can radially extend from a first end 136 to a second end 138 of the outer section 124. Further, the outer section 124 can also extend between two opposing sidewalls, such as, for example, a first sidewall 140 and a second sidewall 142.

Figure 6A:
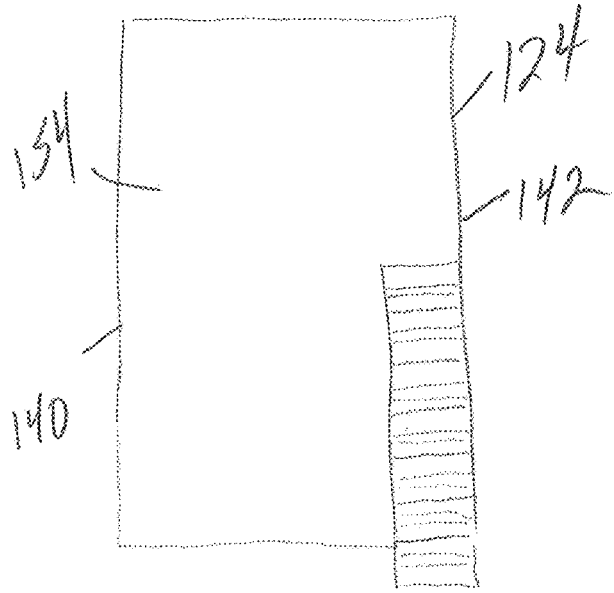
FIGS. 6A-6C illustrate right, front, and left, side views, respectively, of an exemplary outer section of a camera housing for a camera system according to an illustrated embodiment of the subject application.
Figure 6B:
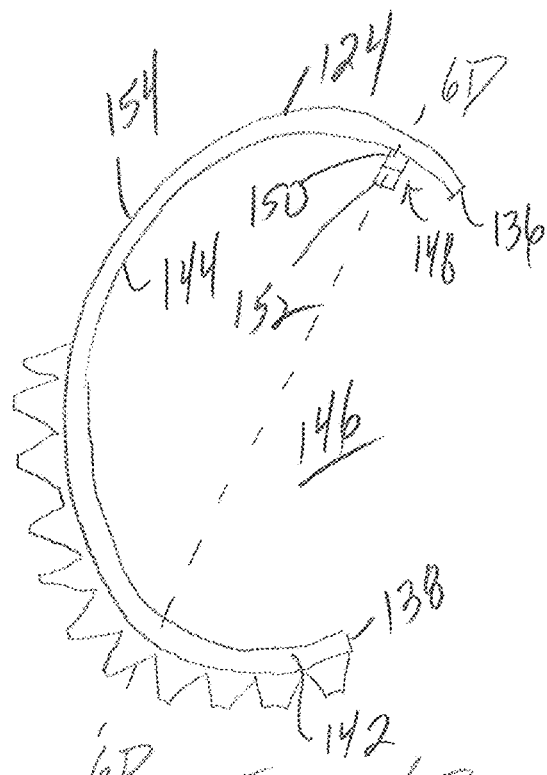
Figure 6C:
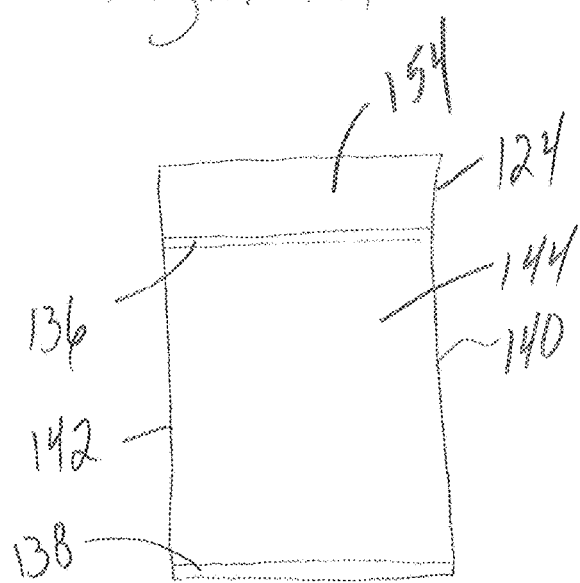
Figure 6D:
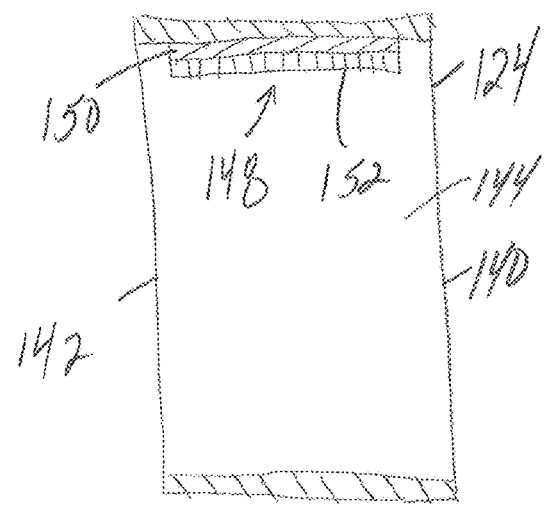
FIG. 6D illustrates a cross sectional view of an exemplary outer section of a camera housing for a camera system taken along line 6D-6D in FIG. 6B.

As seen in at least FIG. 6B, an inner surface 144 of the outer section 124 can generally define an inner region 146 of the outer section 124. The inner region 146 can be sized to accommodate placement of at least a portion of the intermediate and inner sections 126, 128 within and/or beneath the outer section 124 such that the outer section 124 can rotate around at least a portion of the intermediate section 126.

The outer section 124 of the camera housing 122 can also be mounted to at least one outer wiper assembly 148 that is configured to abut against the opposing outer surface 184 (FIG. 7A) of the intermediate section 126 at least as the outer section 124 is rotatably displaced. The outer wiper assembly 148 can include a mounting bracket 150 that is secured to the outer section 124, such as, for example, via one or more mechanical fasteners, including, but not limited to, a screw, bolt, pin, or rivet, or by a weld or adhesive, among other connections. Additionally, or alternatively, the outer wiper assembly 148 can be at least partially secured to the outer section 124 via a mating connector, including, but not limited to, engagements in which the outer wiper assembly 148 or the outer section 124 is received in a slot(s), guide(s), apertures, and/or orifices of the other of the outer wiper assembly 148 and outer section 124, or via a locking, snap, interference fit, or otherwise secure engagements between protrusions and mating recesses or components in the outer wiper assembly 148 and the outer section 124.

According to the illustrated embodiment, a wiper blade 152 is securely coupled to the mounting bracket 150 of the outer wiper assembly 148, including, but not limited to, via one or more mechanical fasteners, a clamping connection, and/or a snap fit connection, among other manners of attachment. Additionally, the wiper blade 152 can have a variety of shapes, including, for example, having a generally V-shape cross sectional shape. Further, the wiper blade 152 can be constructed from a variety of different materials that can wipe debris and other contaminants from, or otherwise generally improve the visibility through, the opposing outer surface 184 (FIG. 7A) of the intermediate section 126, including, for example, an elastomer, among other materials. Additionally, according to certain embodiments, at least portions of the outer wiper assembly 148, including for example the wiper blade 152 and/or the mounting bracket 150, can be replaceable.

The outer section 124 can be rotatably displaced in a variety of manners. For example, as seen in at least FIGS. 6A and 6B, at least a portion of an outer surface 154 of the outer section 124 can be coupled to a gear or serration segment 156 that is configured for mating engagement with a mating first pinion 158 (FIG. 3) that can be operably coupled to a first driver 160, such as, for example, an electric motor, which can be communicatively coupled to the controller 108. According to certain embodiments, the gear segment 156 and the outer section 124 form a monolithic structure. Alternatively, according to certain embodiments, the gear segment 156 can be coupled to the outer surface 154 of the outer section 124, such as, for example, via one or more mechanical fasteners and/or a weld. Further, while FIGS. 6A and 6B illustrate a gear segment 156, according to other embodiments in which the outer section 124 has an enclosed configuration, such as, for example, having a cross sectional shape that is a complete circle, the gear teeth or serrations can extend entirely around a portion of the circumference of an enclosed outer surface 154 of the outer section 124.

Referencing FIGS. 7A-7C, as discussed below, the intermediate section 126 of the camera housing 122 can be constructed to provide one or more lenses 162a-e for use with the camera 134. Additionally, the intermediate section 126 can be coupled to, or otherwise include, an inner wiper assembly 164 that is sized and positioned to remove at least some debris and contaminants from an outer surface 220 (FIG. 8A) of the inner section 128. According to the illustrated embodiment, the intermediate section 126 can include a first portion 166 and a second portion 168.

The first portion 166 can have a shape that may, or may not, be generally the same as the shape of the outer section 124. Moreover, as shown in at least FIG. 7B, according to certain embodiments, the first portion 166 can have can arc shape such that the first portion 166 extends from opposing first and second ends 170, 172 of the first portion 166, as well as between opposing first and second sidewalls 180, 182. Alternatively, according to other embodiments, the first portion 166 of the intermediate section 126 can have an enclosed circular cross sectional shape.

The first portion 166 can be configured to provide one or more lenses 162a-e that are positioned along a circumference of the first portion 166. The lenses 162a-e can provide the camera 134 with the ability to capture different images, and/or be used to detect, via operation of the camera 134, different image types. For example, according to certain embodiments, the first portion 166 has a plurality of lenses 162a-e, with at least one lens 162b providing a wide angle, or fish eye, lens that can enlarge an image(s) of the area of the undercarriage 10 that is captured by operation of the camera 134. Additionally, another lens 162a can provide a standard lens that, when used with the camera 134, can be used to capture an image(s) that can correspond to a view that can be relatively comfortably seen by the human eye. However, a variety of other lenses 162c-e can be used instead of, or in addition to, either of the above-discussed lenses 162a-b, including, for example, a lens 162c that can provide a zoom or magnified close-range view, a lens 162d having a different focal length, and/or a lens 162e that provides light filtering features, among other features, that can improve at least one aspect of the image captured by the camera 134 through the intermediate section 126.

Additionally, the lenses 162a-e can include certain auxiliary lenses that can capture different forms of information. For example, according to certain embodiments, one or more lenses 162a-e can provide infrared (IR) filters. Further, according to certain embodiments, at least one lens 162e can be a distortion lens, including, for example, a frosted lens, among other types of lenses. The captured image(s) obtained by the camera 134 when using such auxiliary lenses can provide, among other information, information relating to differences in light intensity. Analysis of such differences in light intensity can, for example, provide an indication of the direction or orientation in which the vehicle 12 is parked relative to at least the charging station 100, among other information.

The foregoing are merely examples, and do not limit the types, number, and/or combinations of lenses 162a-e that can be provided by the first portion 166 of the intermediate section 126. For example, according to certain embodiments, the plurality of lenses 162a-e can comprise two lenses 162a-b or three lenses 162a-c, among a different number of lenses 162a-e. Additionally, the lenses 162a-e may comprise only certain types of lenses that may, or may not, include auxiliary lenses, such as, for example, the above-discussed auxiliary lenses.

The first portion 166 of the intermediate section 126 can be a monolithic structure, or, alternatively, can be constructed or assembled using a variety of different materials and/or components. For example, according to certain embodiments, at least the first portion 166 of the intermediate section 126 can be constructed such that at least some, if not all, of the lenses 162 and the intermediate section 126, collectively form a monolithic structure. Alternatively, one or more of the lenses 162a-c can be operably secured to the first portion 166 of the intermediate section 126, including, but not limited to, by a one or more mechanical fasteners and/or mechanical engagements, including, but not limited to a clamping and/or interference arrangement, via an adhesive(s), and/or a weld(s), among other manners of connection or attachment. Further, the lenses 162a-e can be positioned about the intermediate section 126 at locations at which the lenses 162a-e can be wiped, or otherwise engaged by, the outer wiper assembly 148 of the outer section 124 during rotational displacement of the outer section 124 and/or of the intermediate section 126.

The intermediate section 126 can be constructed from a variety of materials, including, but not limited to, a relatively transparent acrylic based material. According to certain embodiments, at least an outer surface 184 of the first portion 166 of the intermediate section 126 can be constructed from a material that can enhance the ability to remove debris or other containments from the outer surface 184 via the passive wiping of the outer surface 184 by the wiper blade(s) 152 of the outer wiper assembly(ies) 148. For example, according to certain embodiments, at least an outer surface 184 of the intermediate section 126, if not the entire intermediate section 126, can be constructed from a hydrophobic and scratch resistant material. Alternatively, according to other embodiments, at least the outer surface 184 of the intermediate section 126 can be coated with a hydrophobic and scratch resistant coating.

As seen by at least FIG. 7C, an inner surface 186 of the first portion 166 of the intermediate section 126 can define an inner area 188 of the intermediate section 126. The inner area 188 of the intermediate section 126 can be sized to accommodate placement of at least a portion of the inner section 128, as well as at least a portion of the camera 134 that is positioned within the inner section 128. Moreover, the inner area 188 of the intermediate section 126 can be sized and configured to accommodate selective rotational displacement of the intermediate section 126 about the inner section 128.

As shown in at least FIGS. 7B and 7C, one or more inner wiper assemblies 164 can be secured to, or otherwise part of, the intermediate section 126. Each inner wiper assembly 164 can have a construction similar to the above-discussed construction of the outer wiper assembly 148, and can be secured to the intermediate section 126 in a manner that may, or may not, be the same as, or similar to, that discussed above with respect to the outer section 124 and the outer wiper assembly 148. Additionally, each inner wiper assembly 164 is positioned and configured to wipe away debris and other contaminants from, or otherwise at least wipe an outer surface 220 of the inner section 128 so as to improve the visibility of the camera 134 through the inner section 128.

According to certain embodiments, the second portion 168 of the intermediate section 126 can be inwardly offset from the second sidewall 182 of the first portion 166 such that the first and second sidewalls 180, 182 can both, when operably positioned in a guide housing 190 (FIG. 9), extend into a second guide 192 in, or attached to, both a first sidewall 194 and a second sidewall 196 of a guide housing 190, as discussed below. Thus, according to certain embodiments, the second portion 168 of the intermediate section 126 can be generally perpendicular to, and extend radially inwardly from, the first portion 166 to an orifice 204 in the second portion 168. Additionally, according to certain embodiments, an inner side 198 (FIG. 9) of the intermediate section 126 can include one or more retention slots 200a, 200b that can provide at least support to the inner section 128 and a camera mount 202 as the intermediate section 126 is rotatably displaced during operation of the camera housing 122.

The orifice 204 in the second portion 168 of the intermediate section 126 can include an internal gear or serrations 206 that is configured for mating engagement with a mating second pinion 208 (FIG. 3). The second pinion 208 can be operably coupled to a second driver 210, such as, for example, an electric motor, that can be communicatively coupled to the controller 108. According to certain embodiments, the internal gear 206 and the second portion 168 of the intermediate section 126 form a monolithic structure. Alternatively, according to certain embodiments, internal gear 206 can be coupled to second portion 168 of the intermediate section 126, such as, for example, via one or more mechanical fasteners and/or a weld. Further, while FIGS. 7A and 7B illustrate the internal gear 206 as fully encircling the orifice 204, according to other embodiments the internal gear 206 can be a segment that extends around only a portion of the orifice 204 of the intermediate section 126.

Figure 8A:
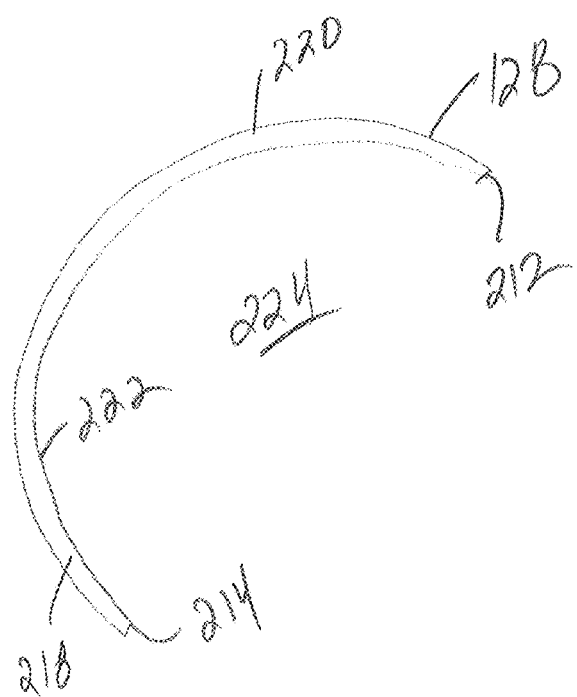
FIGS. 8A and 8B illustrate front and left side views, respectively, of an exemplary inner section of a camera housing according to an illustrated embodiment of the subject application.
Figure 8B:
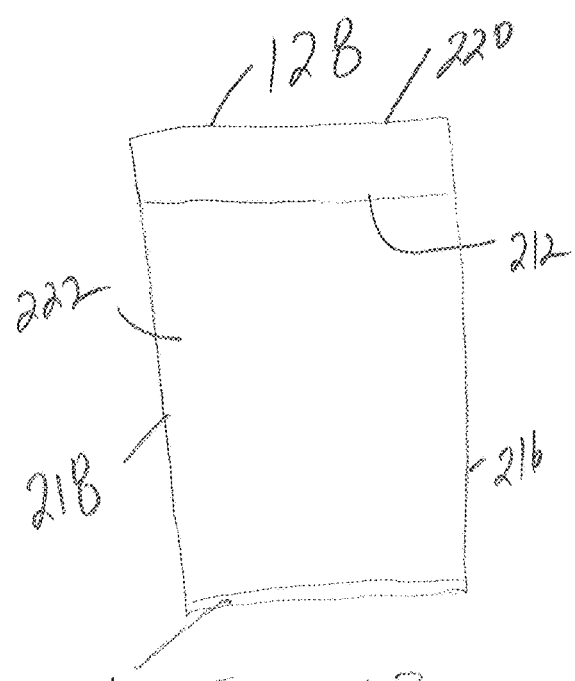

Referencing FIGS. 8A and 8B, the inner section 128 of the camera housing 122 can also have a variety of different shapes, including, but not limited to, circular and non-circular shapes, as well as combinations thereof, among other shapes. For example, according to certain embodiments, the inner section 128 can have a circular cross sectional shape, or, alternatively, have an arc shape, as shown, for example, in at least FIG. 8A. Thus, according to certain embodiments in which the inner section 128 has an at least partial, but not enclosed, circular cross sectional shape, the inner section 128 can radially extend from a first end 212 to a second end 214 of the inner section 128. Further, the inner section 128 can also extend between two opposing sidewalls, such as, for example, a first sidewall 216 and a second sidewall 218. According to certain embodiments, the inner section 128 can be configured to at least generally cover the camera 134.

The inner section 128 can be constructed from a variety of materials, including, but not limited to, a relatively transparent acrylic based material. According to certain embodiments, at least an outer surface 220 of the inner section 128 can be constructed from a material that can enhance the ability to remove debris or other containments from the outer surface 220 via the passive wiping of the outer surface 220 by the wiper blade(s) 152 of the inner wiper assembly(ies) 164 as the intermediate section 126 is rotatably displaced. For example, according to certain embodiments, at least an outer surface 220 of the inner section 128, if not the entire inner section 128, can be constructed from a hydrophobic and scratch resistant material. Alternatively, according to other embodiments, at least the outer surface 220 of the inner section 128 can be coated with a hydrophobic and scratch resistant coating.

As seen in at least FIG. 8A, an inner surface 222 of the inner section 128 can generally define an interior area 224 of the inner section 128 that can be sized to accommodate placement of least a portion of the camera 134, as well as components or other circuitry 226 (FIG. 9) associated with transmitting information, including images obtained by operation of the camera 134, between the camera 134 and the controller 108. From example, according to certain embodiments, the camera system 118 can communicate with the controller 108 via a wired connection(s), while according to other embodiments, such communications are wireless communications that can occur via use of a variety of different types of wireless communication protocols and use of the associated circuitry/components. Further, according to certain embodiments, the camera system 118 can include a transceiver that is used to at least communicate with the controller 108.

A variety of different types of cameras can be utilized for the camera 134. For example, according to certain embodiments, the camera 134 has at least still type camera functionalities such that the camera 134 can capture single or static images. Alternatively, or additionally, according to other embodiments, the camera can have video type functionalities. Additionally, according to certain embodiments, the camera 134 can be configured to provide a visual representation of a scene as optically detectable to the human eye, and/or can detect other images or information, including, for example, information that may be detected via use of an infrared camera, among other types of cameras.

Figure 9:
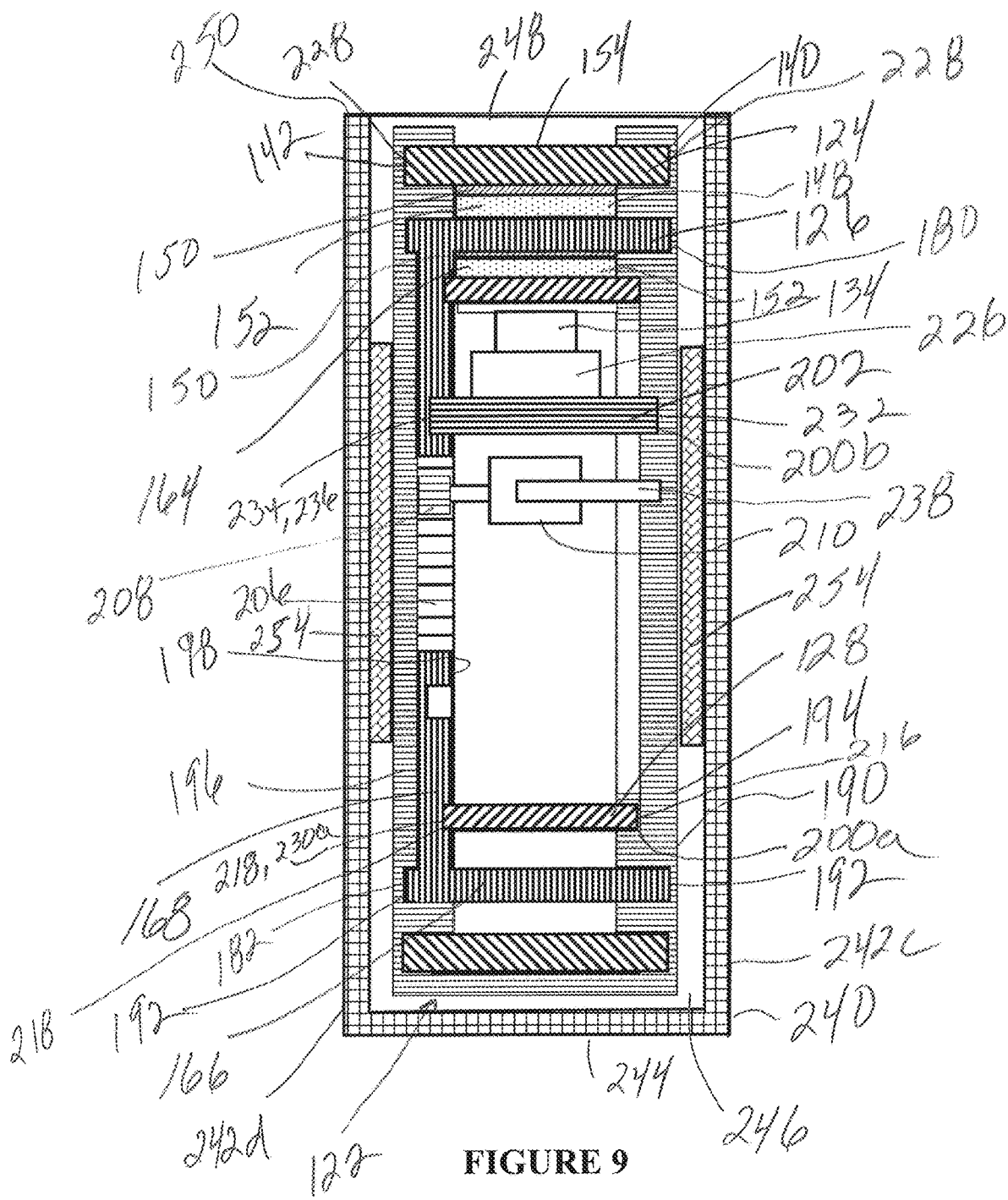
FIG. 9 illustrates a front side cross sectional view representation of an exemplary camera system according to an illustrated embodiment of the subject application.

FIG. 9 illustrates a front side cross sectional view representation of an exemplary camera system 118 according to an illustrated embodiment of the subject application. As seen, the camera housing 122 can also include the guide housing 190 that, as previously discussed, can include the first sidewall 194 and the second sidewall 196, which may, or may not, be connected to each other. Additionally, as also previously discussed, the inner sides 198 of the first and second sidewalls 194, 196 can each have include a plurality of guides, tracks, and/or slots that can at least assist in guiding the rotational displacement of at least a portion of the camera housing 122 and/or provide support for portions of the camera housing 122 or other portions of the camera system 118.

For example, as shown in FIG. 9, according to certain embodiments, inner sides 198 of both the first and second sidewalls 194, 196 of the guide housing 190 can include a first guide or track 228 that is configured to receive a portion of the adjacent first or second sidewall 140, 142, respectively, of the outer section 124, and the second guide or track 192 that is configured to receive a portion of the adjacent first and second sidewall 180, 182, respectively, of the intermediate section 126. The first and second guides 228, 192 can, when the corresponding first and second sidewalls 140, 142, 180, 182 of the associated outer and intermediate sections 124, 126 are positioned therein, support the outer and intermediate sections 124, 126 and/or guide the rotational displacement of the outer and intermediate sections 124, 126. The first and second guides 228, 192 can take a variety of forms, including, for example, being recesses into, or tracks that are attached to, the inner sides 198 of the first and second sidewalls 194, 196 of the guide housing 190. Further, as the first and second guides 228, 192 can at least assist in guiding the rotational movement of the associated outer and intermediate sections 124, 126 of the camera housing 122, the first and second guides 228, 192 can have generally circular or arched configurations. Additionally, according to certain embodiments, the first and second guides 228, 192 can each have lengths between opposing ends of the first and second guides 228, 192 that generally correspond to the distance that the associated outer section 124 or intermediate section 126 is to be rotated during operation of the camera system 118.

The inner side 198 of the first sidewall 194 and/or second sidewall 196 of the guide housing 190 can also be configured to receive and/or be attached to other components of the camera housing 122 and/or camera system 118. For example, as shown in FIG. 9, the first sidewall 216 of the inner section 128 of the camera housing 122 can be received in a slot 200a in the first sidewall 194 of the guide housing 190, while the second sidewall 218 of the inner section 128 is received in a similar slot 230a in the second portion 168 of the intermediate section 126. Additionally, according to the illustrated embodiment, as the inner section 128 can have a circular cross sectional shape, the slots 200a, 230a in the first sidewall 194 of the guide housing 190 and the second portion 168 of the intermediate section 126 can generally be ring shaped such that the inner section 128 does not preclude rotational displacement of the intermediate section 126.

Similarly, the camera mount 202, which can support the camera 134 and other related components 226, can be securely mounted at a first end 232 of the camera mount 202 to at least the first sidewall 194 of the guide housing 190. Further, according to certain embodiments, a second end 234 of the camera mount 202 can be set in a ring-shaped recess 236 in the second portion 168 of the intermediate section 126 such that the second portion 168 of the intermediate section 126 can provide at least a degree of support to the camera mount 202, even as the intermediate section 126 is rotatably displaced. Additionally, the second driver 210 can also be secured in a relatively fixed manner to the first sidewall 194 of the guide housing 190, such as, for example, be mounted to a bracket 238 that is securely affixed to the first sidewall 194 of the guide housing 190.

Figure 10:
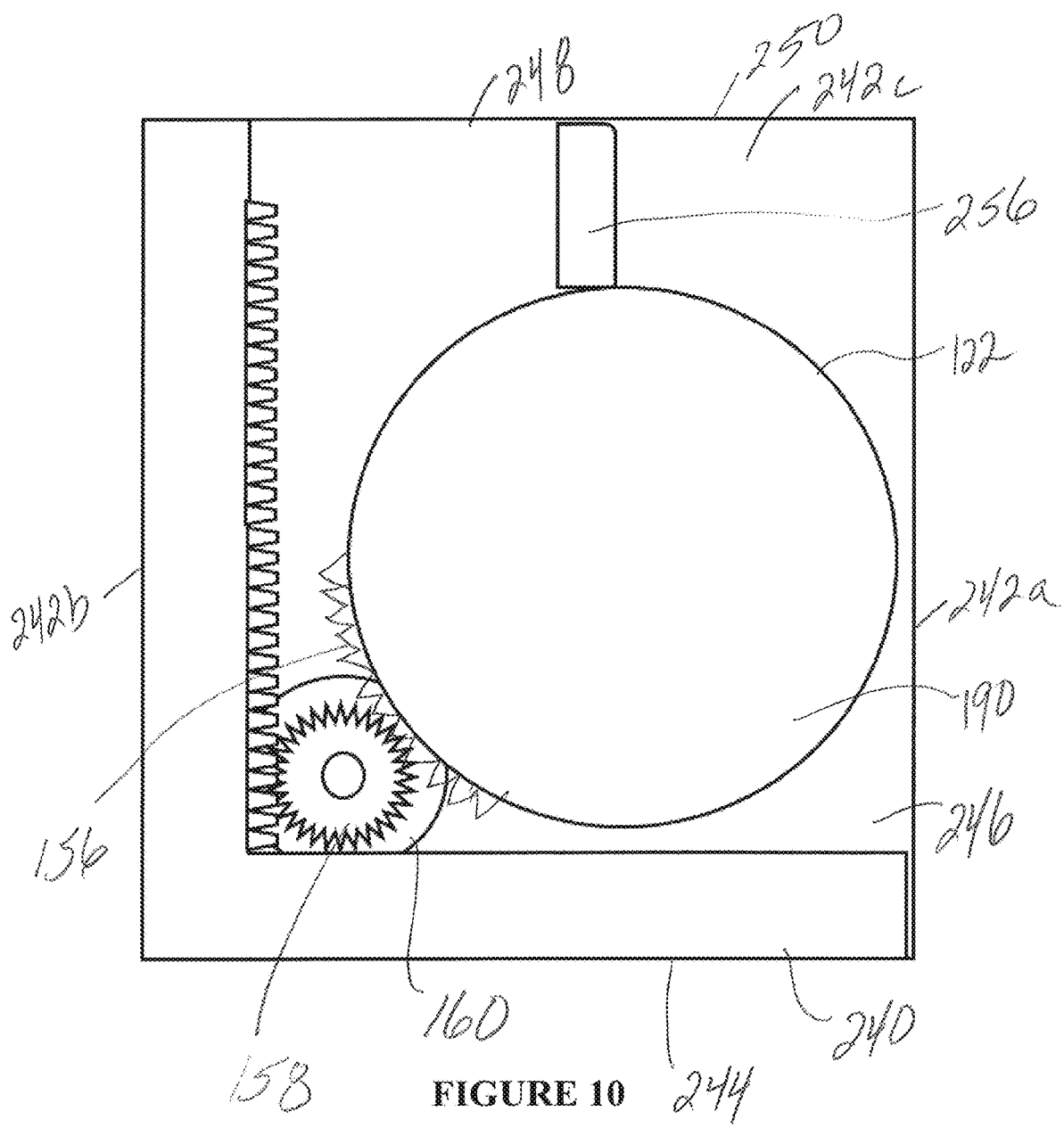
FIG. 10 illustrates a side view representation of an exemplary camera system according to an illustrated embodiment of the subject application.

Referencing FIGS. 9 and 10, the camera housing 122 can be secured within an assembly housing 240, which may be part of the camera system 118 or a portion of the moveable arm 120 of the charger unit 106, among other components of the charging station 100. The assembly housing 240 can include opposing sidewalls 242a-d that are coupled to a base 244, and which collectively can define an inner region 246 of the assembly housing 240 that is sized to receive placement of at least a portion of the camera system 118. The assembly housing 240 can also include an opening 248 at a top portion 250 of the assembly housing 240 that is in fluid communication with the inner region 246 of the assembly housing 240.

The assembly housing 240 can include a rack 252 having a plurality of teeth or serrations that are configured to matingly engage the first pinion 158 as the first pinion 158 also simultaneously engages the gear segment 156 of the outer section 124. The rack 252 can be configured and positioned such that engagement of the rack 252 by the first pinion 158 can, when the first pinion 158 is rotated in a first direction, such as, for example, in a clockwise direction via operation of the first driver 160, result in the camera housing 122 and guide housing 190 being lifted together in a generally upwardly and/or outwardly direction toward the top portion 250 of the assembly housing 240. According to certain embodiments, such lifting of at least the camera housing 122 can result in at least a portion of the camera housing 122 moving from a first position at which the camera housing 122 is at least generally flush with, if not recessed beneath, the top portion 250 and/or opening 248 of the assembly housing 240, to an extended second position in which the assembly housing 240 protrudes out from, or beyond, the top portion 250 and/or opening 248 of the assembly housing 240. As the first pinion 158 is also simultaneously engaged with the gear segment 156 of the outer section 124, such rotation of the first pinion 158 as the camera housing 122 is lifted can coincide with the outer section 124 being rotatably displaced from an extended position to a retracted position so as to reveal at least a portion of the intermediate section 126 through which the camera 134 can capture an image(s) of the undercarriage 10 of the vehicle 12.

Conversely, when the first pinion 158 is rotated in a second, opposite direction, such as, for example, in a counterclockwise direction via operation of the first driver 160, the camera housing 122 can be retracted back into the assembly housing 240, such as, for example, in a direction generally toward the base 244 of the assembly housing 240, such that the camera housing 122 returns to the first position at which the camera housing 122 is at least flush with, if not recessed beneath, the top portion 250 and/or opening 248 of the assembly housing 240. Additionally, such rotation of the first pinion 158 via operation of the first driver 160 can simultaneously facilitate rotation of the outer section 124 of the camera housing 122 to the extended position at which the outer section 124 again covers the intermediate section 126 in a manner in which the outer section 124 again protects the intermediate section 126, such as, for example, from damage that could be associated with a wheel/tire of the vehicle 12 rolling over or onto the camera housing 122.

According to certain embodiments, in view of the above-discussed linear displacement of the camera housing 122 and the simultaneous rotational displacement of the outer section 124, the first driver 160 can be mounted to the assembly housing 240 and/or camera housing 122 in a manner that can accommodate linear displacement of the first driver 160 in the same general linear direction as the camera housing 122. For example, according to certain embodiments, the first driver 160 can be coupled to a portion of the camera housing 122 that does not rotate, such as, for example, via a bracket, such that the first driver 160 is linearly displaced with the linear displacement of the camera housing 122.

Additionally, as seen in FIG. 9, both the first sidewall 194 and the second sidewall 196 of the guide housing 190 can be attached to, or otherwise include, a guide arm 254. Each guide arm 254 can be configured to be received in, or otherwise mate, a guide slot 256 (FIG. 10) in an adjacent sidewall 242c-d of the assembly housing 240. The guide arms 254 and corresponding guide slots 256 can at least assist in directing the linear displacement of the camera housing 122 between the above-discussed first, recessed or flush position, and the second position at which at least a portion of the camera housing 122 protrudes out from the assembly housing 240.

With respect to at least automatic electric vehicle charging systems 102 in which the charger unit 106, and moreover, the plug head 104 of the charger unit 106, is positioned to be beneath an undercarriage 10 of the vehicle 12, one or more sensors 114 of the automatic electric vehicle charging system 102 may provide information to the controller indicative of the presence of the a vehicle 12 above the charger unit 106. Additionally, or alternatively, the controller 108 of the charging station 100 may receive a communication from a controller on the vehicle 12 indicating the presence of the vehicle 12 at least in the vicinity of the charger unit 106, as well as provide other information to the controller 108 of the charging station 100, including for example, but not limited to, information identifying the vehicle 12, such as information relating to a make and/or model of the vehicle 12, among other information. The controller 108 can then, in at least certain circumstances, operate drivers associated with the moveable arm 120 of the charging station 100 in a manner that may adjust a location of the camera system 118 relative to at least the vehicle 12.

The controller 108 can also issue a command or signal that initiates operation of the first driver 160. Such initiation of the first driver 160 can facilitate rotation of the first pinion 158 is a first direction. As the first pinion 158 is rotated in the first direction, the engagement between the first pinion 158 and the teeth of the rack 252 can linearly displace the camera housing 122 toward, and possibly at least partially out of, the opening 248 in the assembly housing 240. Additionally, as the first pinion 158 is rotated, the first pinion 158 can also be engaging the gear segment 156 such that, as the camera housing 122 is being linearly raised from the first position, the outer section 124 is being retracted. As previously discussed, such rotation or retraction of the outer section 124 of the camera housing 122 results in the wiper blade(s) 152 of the outer wiper assembly(ies) 148 being moved across at least a portion of the outer surface 184 of the first portion 166 of the intermediate section 126. Such movement of the outer wiper assembly(ies) 148 can passively wipe at least some debris and other contaminants from the intermediate section 126 so as to at least attempt to improve the clarity for the camera 134 through the lenses 162a-e of the intermediate section 126. The controller 108 can also control the duration or timing of operation of the first driver 160 so as to at least partially control the extent that the camera housing 122 is linerally displaced and the extent the outer section 124 is rotatably displaced.

During, or alternatively after, the camera housing 122 is being, or has been, lifted via operation of the first driver 160, the controller 108 can provide a signal to the camera system 118 that initiates operation of the second driver 210. Such operation of the second driver 210 facilitates rotation of the second pinion 208, which, in view of the engagement of the second pinion 208 with the teeth of the internal gear 206 of the intermediate section 126, facilitates rotational displacement of the intermediate section 126 of the camera housing 122 away from an initial angular orientation of the intermediate section 126. The signal(s) provided by the controller 108 can indicate that duration that the second driver 210 is to be operated, and thus the extent the intermediate section 126 is to be rotatably displaced. For example, the controller 108 can provide a signal(s) for the second driver 210 that causes the second driver 210 to be operated for a duration that aligns a particular or selected lens 162a with the camera 134 such that the view of the carriage underside of the vehicle 12 from the camera 134 is through the selected lens 162a. For example, the controller 108 may provide a signal (s) that operates the second driver 210 for a first duration of time such that a first lens 162a, such as, for example, a standard lens that provides the camera 134 with a view of the underside of the vehicle 12 that is similar to a view that can be relatively comfortably seen by the human eye, is positioned for use with the camera 134 while the camera 134 is capturing an image(s). Additionally, as previously discussed, as the intermediate section 126 is rotated, the wiper blade(s) 152 of the inner wiper assembly(ies) 164 can wipe an outer surface 220 of the inner section 128 of the camera housing 122, thereby passively removing debris and other contaminants from at least an outer surface 220 of the inner section 128.

The camera 134 can then capture one or more images of the undercarriage 10 of the vehicle 12, and those captured images, or related data, can be provided to the controller 108 for subsequent analysis and/or image processing. Such analysis can include, but is not limited to, analyzing the structure of the undercarriage 10 to determine information relating the vehicle 12, such as, for example, a make or model of the vehicle 12, and/or an identification of a particular feature of, or attached to, the vehicle, such as, for example, the VSU 14. Additionally, or alternatively, such analysis of the image(s) captured by the camera 134 can include detecting the location of certain markers or distinctive features of, on, and/or around the undercarriage 10 and/or vehicle 12, including, but not limited to, one or more light emitting diodes (LEDs) 241 (FIGS. 1 and 2) positioned about the undercarriage 10, among other features, to determine locations of the camera system 118, charger unit 106, and/or charging station 100 relative to a least a portion of the vehicle 12. According to certain embodiments, such relative location information can be utilized by the controller 108 to at least assist in determining a relative location of the VSU 14, and/or to guide the movement of the moveable arm 120 of the charger unit 106 such that the plug head 104 is moved into position for electrical coupling to the VSU 14.

The controller 108 can also be configured to utilize more than one lens 162a-e when capturing images of the underside of the vehicle 12. For example, the controller 108a-e can be configured to selectively capture images using different optic features of the different lenses 162a-e for at least comparative and/or confirmation purposes. Additionally, or alternatively, in the event the controller 108 is unable to derive certain information from an image(s) captured using a first lens 162a, including, for example, due to variances in the degree of light while capturing the image(s), the controller 108 can again initiate the second driver 210 for a second duration of time to move another lens 162b, such as, for example, a wide angle lens, into position for use by the camera 134 when capturing an image(s). Such a wide-angle, or fish eye, lens can assist the camera 134 in capturing a larger, or more expansive, view of the details and/or locations of components on and/or at the undercarriage 10 of the vehicle 12. The controller 108 may continue to utilize different lenses 162c-e until relative locations and/or orientations of the vehicle 12, VSU 14, and/or undercarriage 10 with respect to at least a portion of the charging station 100, including, for example, relative to the charger unit 106 and/or plug head 104 is, or can be, determined.

With the relative locations and/or orientations of the vehicle 12, VSU 14, and/or undercarriage 10 with respect to at least a portion of the charging station 100 determined via at least information provided by operation of the camera system 118, the controller 108 can provide signals to facilitate displacement of the plug head 104 in a manner that results in the plug head 104 being electrically coupled to the VSU 14. Electrical charging of the battery 16 can then proceed.

Upon completion of use of the camera system 118, the controller 108 can operate the second driver 210 so that second pinion 208 is rotated in a direction that facilitates rotational displacement of the intermediate section 126 of the camera housing 122 back to the initial position of the intermediate section 126. Such displacement of the intermediate section 126 can also again result in the wiper blade 152 of the inner wiper assembly 164 being displaced along an outer surface 220 of the inner section 128 as the inner wiper assembly(ies) 164 is displaced with the rotational displacement of the intermediate section 126. Additionally, the controller 108 can also initiate a signal to again activate the first driver 160 in a manner that returns the camera housing 122 to a recessed location within the assembly housing 240 and/or to a location at which the camera housing 122 is generally flush with the top portion 250 and/or opening 248 of the assembly housing 240. Such operation of the first driver 160 can also, via engagement of the first pinion 158 with the gear segment 156, simultaneously rotate the outer layer 124 if the camera housing 122 back to an extended, protective position over at least the intermediate section 126.

While the disclosure has been described in connection with what is presently considered to be the most practical and preferred embodiment, it is to be understood that the disclosure is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the disclosure, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An apparatus for housing a camera, the apparatus comprising:

an outer layer having an inner surface and an outer surface, the inner surface coupled to an outer wiper assembly;

an intermediate layer having an outer surface, an inner surface, and one or more lenses, the outer surface of the intermediate layer being positioned for engagement with the outer wiper assembly, the inner surface of the intermediate layer being coupled to an inner wiper assembly;

an inner layer having an outer surface and an inner surface, the outer surface of the inner layer being positioned for engagement by the inner wiper assembly, the inner surface of the inner layer defining an interior area that is sized to receive placement of the camera, wherein the outer layer is concentric with the intermediate layer and the inner layer, the outer layer being rotatably displaceable relative to at least the intermediate layer such that, during rotation of the outer layer, the outer wiper assembly wipes the outer surface of the intermediate layer, and wherein the intermediate layer is rotatably displaceable relative to at least the inner layer such that, during rotation of the intermediate layer, the inner wiper assembly wipes the outer surface of the inner layer.

2. The apparatus of claim 1, wherein the outer surface of the outer layer is coupled to a first gear, and wherein the apparatus further includes a first driver that is coupled to a first pinion, the first pinion being engaged with the first gear.

3. The apparatus of claim 2, further including an assembly housing having an inner region and a rack, the inner region being sized to receive placement of the outer, intermediate, and inner layers, the first pinion being simultaneously engaged with both the rack and the first gear.

4. The apparatus of claim 3, wherein the first gear is a gear segment.

5. The apparatus of claim 2, wherein the apparatus further includes a second driver that is coupled to a second pinion, the second pinion being engaged with a second gear that is coupled to the intermediate layer.

6. The apparatus of claim 5, wherein the second gear comprises an internal gear.

7. The apparatus of claim 1, wherein the outer surface of at least one of the intermediate layer and the inner layer comprises a hydrophobic material.

8. The apparatus of claim 1, wherein the one or more lenses includes a wide angle lens.

9. The apparatus of claim 1, wherein the outer layer comprises a non-transparent material, and the inner and intermediate layers each comprise a transparent material.

10. The apparatus of claim 1, wherein the outer wiper assembly is positioned and sized to wipe a surface of the intermediate layer as the outer layer is rotatably displaced about the intermediate layer, the inner wiper assembly positioned and sized to wipe a surface of the inner layer as the intermediate layer is rotatably displaced about the inner layer, and wherein the apparatus further comprises:

a first driver coupled to a first pinion, the first pinion operably engaged with a first gear of the outer layer so that operation of the first driver is translated into rotational displacement of the outer layer about the intermediate layer;

a second driver coupled to a second pinion, the second pinion operably engaged with a second gear of the intermediate layer so that operation of the second driver is translated into rotational displacement of the intermediate layer about the inner layer; and an assembly housing having a rack that operably engages the first pinion while the first pinion is operably engaged with the first gear such that operation of the first driver is translated into linear displacement of the camera housing while the outer layer is simultaneously being rotatably displaced.

11. The apparatus of claim 10, further including a camera positioned within at least a portion of an interior area of the inner layer and positioned to capture an image through both the inner layer and at least one lens of the one or more lenses of the intermediate layer.

12. The apparatus of claim 11, further including a guide housing that is coupled to at least a portion of the outer layer and the intermediate layer, the guide housing configured to guide rotational displacement of the outer and intermediate layers.

13. The apparatus of claim 11, wherein at least a portion of at least one of the intermediate layer and the inner layer comprises a transparent hydrophobic material.

14. The apparatus of claim 10, wherein the outer wiper assembly and the inner wiper assembly each include a wiper blade.

15. The apparatus of claim 10, wherein the one or more lenses comprises a plurality of lenses, and wherein at least one of the plurality of lenses is a wide angle lens.

\* \* \* \* \*